W. E. JENKINS.
TRANSMISSION GEARING.
APPLICATION FILED MAR. 18, 1909.
944,872.
Patented Dec. 28, 1909.
4 SHEETS—SHEET 1.
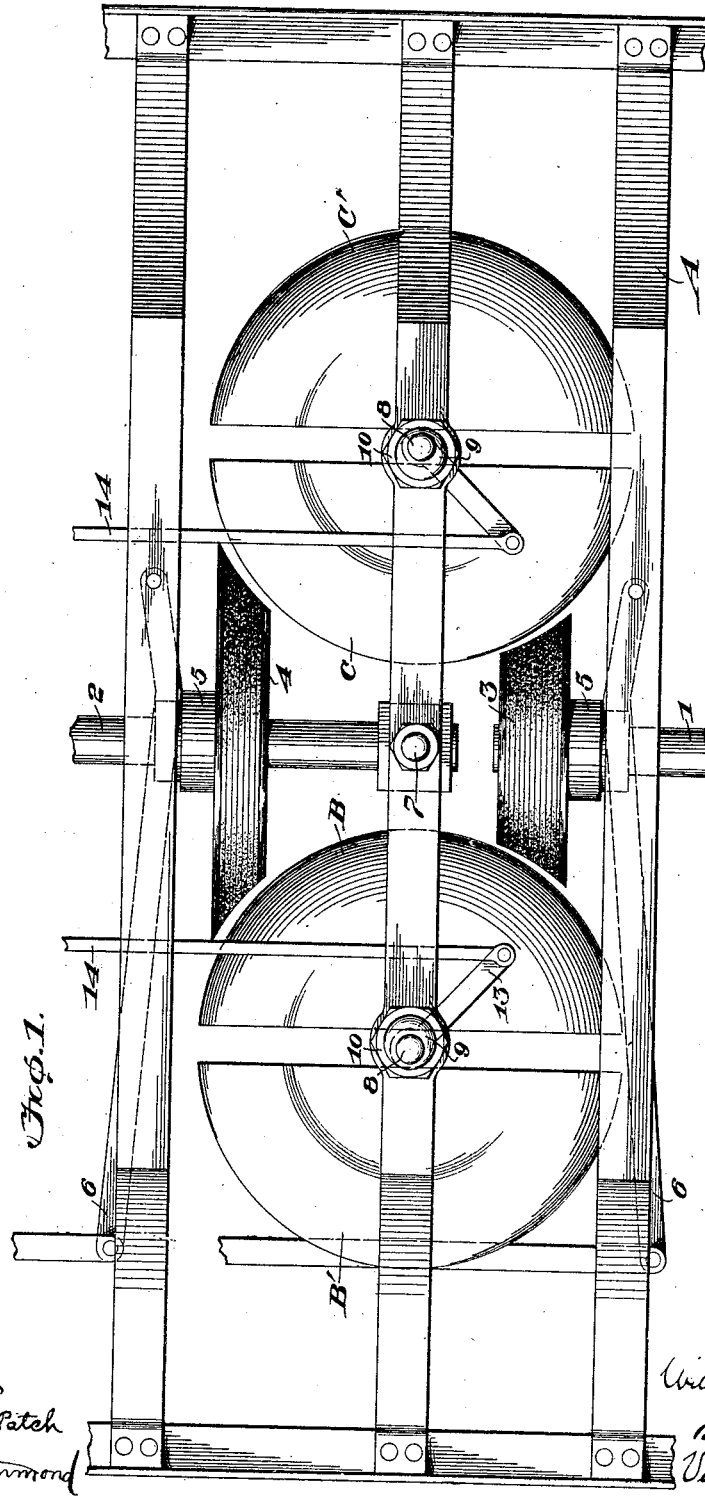

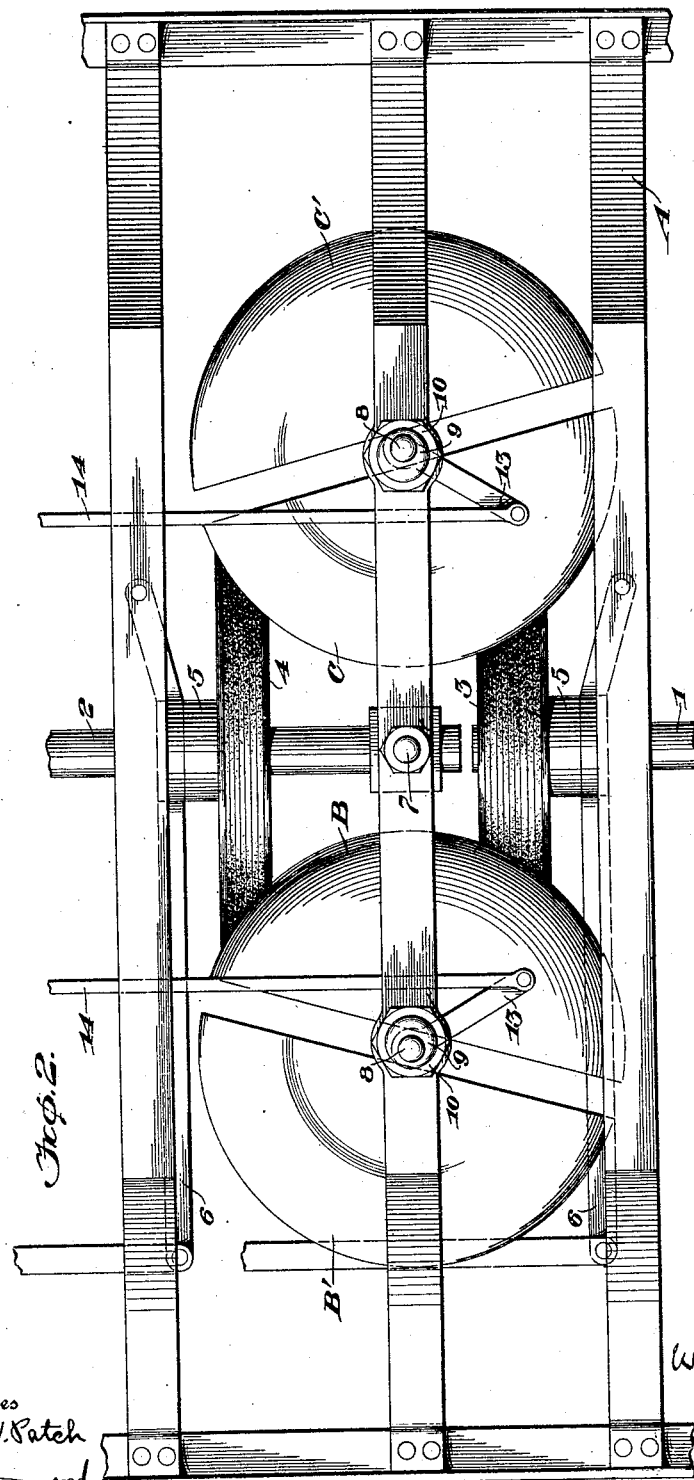

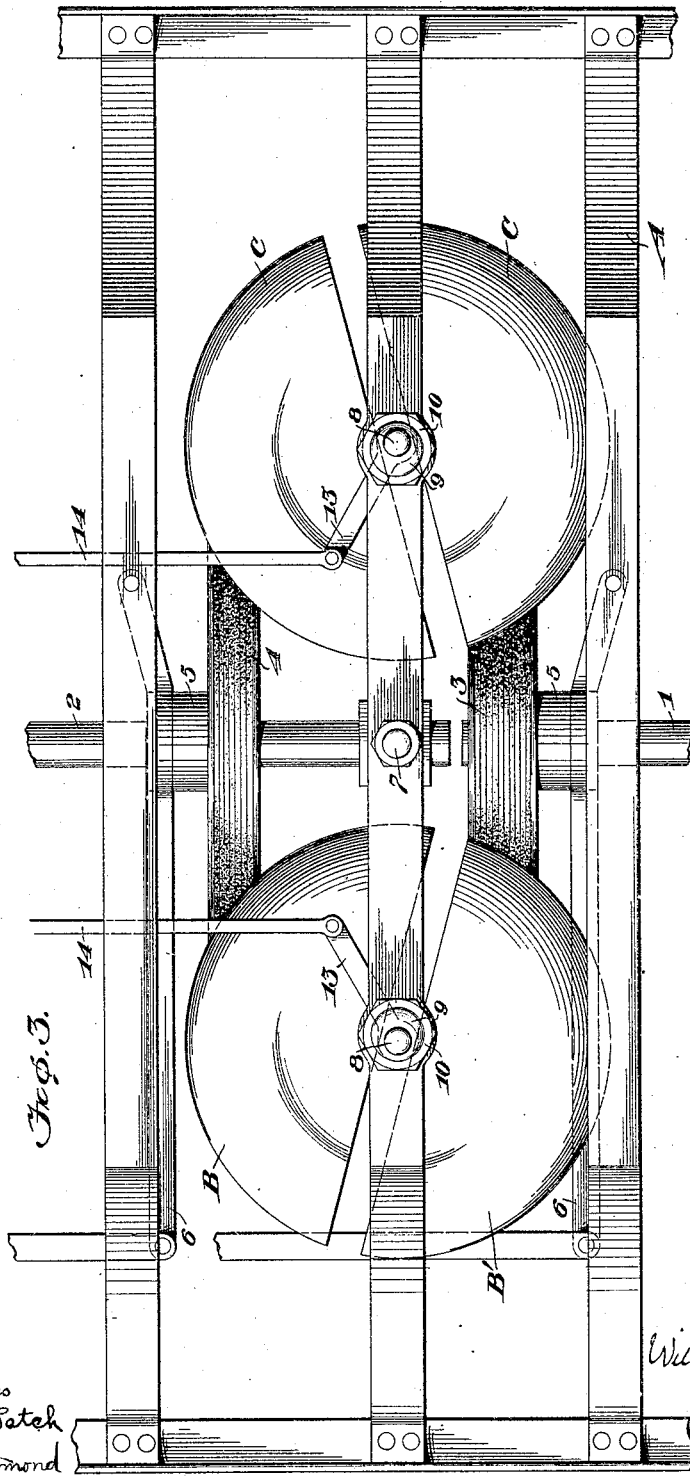

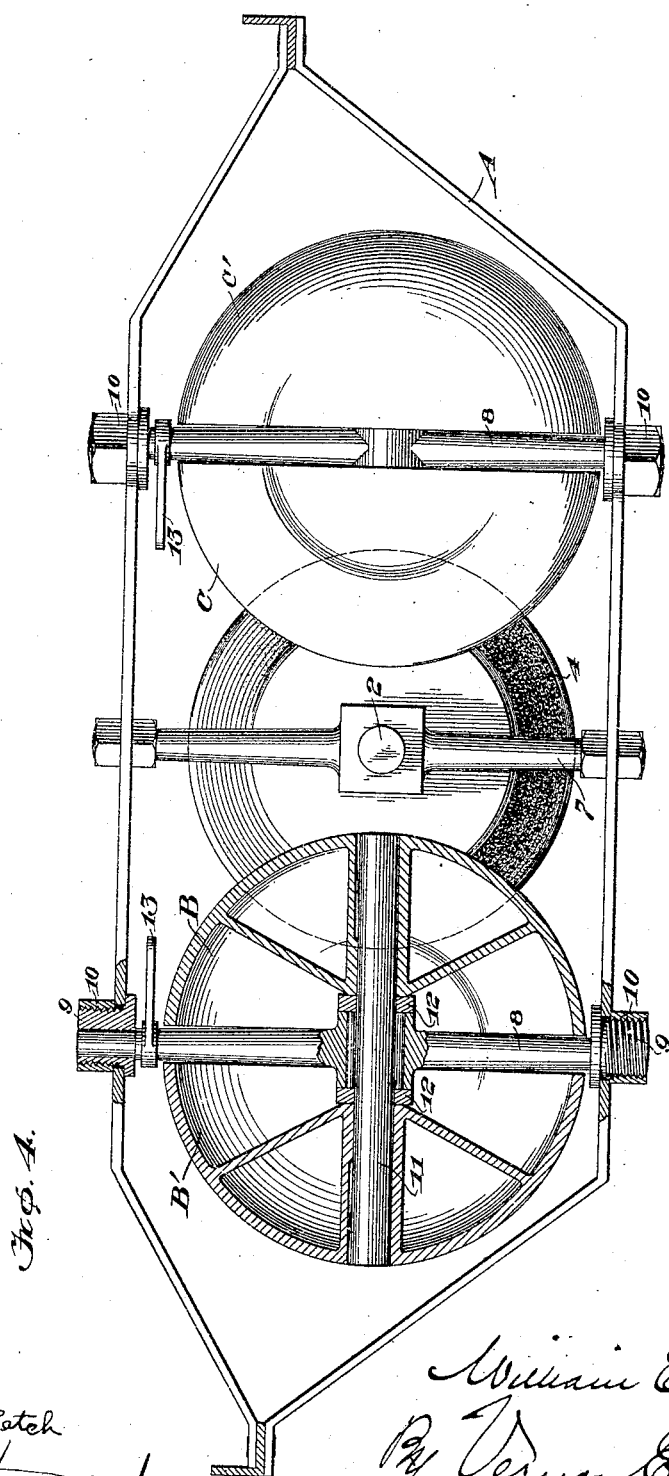

UNITED STATES PATENT OFFICE.

WILLIAM E. JENKINS, OF MILTON, PENNSYLVANIA.

TRANSMISSION-GEARING.

944,872.

Specification of Letters Patent. Patented Dec. 28, 1909.

Application filed March 18, 1909. Serial No. 484,212.

*To all whom it may concern:*

Be it known that I, WILLIAM E. JENKINS, a citizen of the United States, residing at Milton, in the county of Northumberland and State of Pennsylvania, have invented certain new and useful Improvements in Transmission-Gearing, of which the following is a specification.

My invention relates to an improvement in transmission gearing, and the object is to provide means for operating the driven and drive shafts, whereby either the drive shaft will rotate faster than the driven shaft, or the driven shaft will rotate faster than the driving shaft; and a further object is in the provision whereby the means which regulates the speed of the driving and driven shafts can be operated for reversing the driven shaft.

The invention consists in certain novel features of construction and combinations of parts which will be hereinafter described and pointed out in the claims.

In the accompanying drawings:—Figure 1 is a top plan view showing the driving and driven wheels out of engagement with the spherical disks, Fig. 2 is a top plan view showing the driving and driven wheels in engagement with the spherical disks, Fig. 3 is a view in top plan showing the disks in engagement with the driving and driven wheels for reversing the direction of rotation of the driven wheel, and Fig. 4 is a view in side elevation showing certain parts in section, and the driving wheels removed.

A, represents the frame upon which the driven and driving shafts 1 and 2, respectively, are slidably mounted. A friction wheel 3 is mounted on the driving shaft, and a friction wheel 4 is mounted on the driven shaft. A post 7 is mounted in the frame A between the two frictional disks, and journaled in the post is one end of the driven shaft 2. Collars or abutments 5, are formed in the rear of the wheels 3 and 4, and on the driving and driven shafts, against which levers 6 are brought into engagement for forcing the friction wheels 3 and 4 inward for operating the spherical disks B and C. Posts 8 are supported within the frame A in eccentric bearings which are composed of sleeves 9, in which the posts are received, and the sleeves are adapted to be received within the frame. The outer surface of the sleeves are screw-threaded, upon which nuts 10, 10, are received for holding the posts in proper position. By the different adjustments of the sleeves by the nuts 10, wear can be taken up from the posts which are capable of revolving within the sleeves of bearings 9, and by turning these eccentric bearings or sleeves 9, the wear can be taken up very readily without the necessity of substituting new bearings as the bearings become worn. Shafts 11, are journaled in the posts 8, and are provided with a roller bearing in the post, the bearings being held in position by collars 12 on the shafts 11.

Mounted on the shafts 11 are the spherical disks B, B', C, C', each shaft 11 carrying two disks. Mounted on the posts 8 are levers 13 which are engaged by links 14, for oscillating the spherical disks for changing the speed of the two friction wheels.

When the levers 6 are operated for throwing the friction wheels 3 and 4 inward to engage the spherical disks B and C, motion having been transmitted to the driving shaft 1, motion is transmitted to the spherical disks B and C, which in turn transmit motion to the driven shaft 2 through friction wheel 4, thereby driving the driven shaft for a forward speed. The speed of the driven shaft is regulated by oscillating the spherical disks by the levers 13 and the links 14. When the spherical disks are moved toward the driving wheel 3, the central portion of the spherical wheels is brought into contact with the driving wheel, and the outer edge or portion in contact with the driven wheel 4, thereby causing the wheel 4 to revolve at an increased rate of speed. When the disks B and C are moved in the opposite direction, or toward the wheel 4, it will bring the outer portion of the disk in contact with the driving wheel 3, and the central portion in contact with the driven wheel 4, thereby reducing the speed of the driven wheel 4.

In reversing the motion of the driven wheel 4, the posts are rotated by the levers 13, causing disks B and C to be brought into engagement with the driving wheel 3, and the disks B' and C' to be brought into engagement with the friction wheel 4. The motion from the driving shaft 1 to cause the wheels B and C to rotate, transmits the same rotary motion to the disks B' and C', and the shafts 11, and as the disks B' and C' are in engagement with the driven wheel 4, the wheel 4 is caused to travel the same direction as the driving wheel 3.

It is my intention to apply this transmission gearing to motor vehicles, or any class of vehicles upon which a frictional gearing could be used. I have provided a simple means for obtaining different speeds, and a reversing mechanism whereby the motion of the driven wheel is reversed by operating the same lever which would be used for changing the forward speed of the driven wheel.

The provision for taking up the wear of the posts or shaft which supports the shaft of the spherical disk is simple and permits of the wear being taken up very readily, and without the necessity of substituting new bearings for the posts as they become worn.

It is evident that more or less slight changes might be resorted to in the form and arrangements of the several parts described without departure from the spirit and scope of my invention, and hence I do not wish to limit myself to the exact construction herein set forth, but:—

Having fully described my invention, what I claim as new and desire to secure by Letters Patent, is:—

1. In a transmission gearing, the combination with driving and driven wheels, of disks adapted to engage the driving and driven wheels, and means for operating the disks for giving a forward or reverse motion to the driven wheel.

2. In a transmission gearing, the combination with a frame, of driving and driven wheels, shafts mounted on the frame, a plurality of disks adapted to engage the driving and driven wheels, and means for operating the disks whereby a forward motion is transmitted to the driven wheel when certain of the disks are in engagement with the driving and driven wheels, and a reverse motion is transmitted to the driven wheel, when one of the disks is in engagement with the driving wheel and another disk is in engagement with the driven wheel.

3. In a transmission gearing, the combination with a frame, of driving and driven wheels, shafts mounted on the frame, two spherical disks mounted on each shaft adapted to engage the friction wheels, and means for rotating the shafts, whereby a forward motion will be transmitted to the driven wheel and upon further rotation of the shafts a reverse motion will be transmitted to the driven wheel.

4. In a transmission gearing, the combination with a frame, of driving and driven wheels, posts journaled in the frame, shafts movably mounted on the posts, disks mounted on the shafts, and means for operating the shafts whereby certain disks are actuated for transmitting forward motion to the driven wheel and upon further movement of the shafts all of the disks are brought into engagement with the driving and driven wheels, for transmitting a reverse motion to the driven wheel.

5. In a transmission gearing, the combination with a frame, of driving and driven wheels, shafts mounted on the frame, two disks mounted on each shaft, and means for operating the shafts whereby two of the disks are brought into engagement with the driving wheel and two of the disks with the driven wheel whereby a reverse motion is transmitted to the driven wheel.

6. In a transmission gearing, the combination with a frame, of driving and driven wheels, posts journaled in the frame, shafts rotatably mounted on the posts, disks mounted on the shafts, adapted to engage the driving and driven wheels, and means for operating the shafts for changing the speed of the driven wheel.

7. In a transmission gearing, the combination with a frame, of driving and driven wheels, posts journaled in the frame, means for adjusting the posts for taking up the wear of the posts, shafts rotatably mounted on the posts, disks mounted on the shafts, adapted to engage the driving and driven wheels, and means for operating the shafts for changing the speed of the driven wheel.

8. In a transmission gearing, the combination with a frame, of driving and driven wheels, posts, eccentric bearings on the frame in which the posts are journaled whereby the wear of the posts may be taken up, shafts rotatably mounted on the posts, friction disks on the shafts adapted to engage the driving and driven wheels, and means for operating the shafts whereby a forward and reverse motion can be transmitted to the driven wheel.

In testimony whereof I affix my signature, in the presence of two witnesses.

W. E. JENKINS.

Witnesses:
WM. P. WENDLE,
CLARENCE B. MITCHELL.